United States Patent [11] 3,604,951

[72] Inventor Frank J. Zgebura
Whippany, N.J.
[21] Appl. No. 787,375
[22] Filed Dec. 27, 1968
[45] Patented Sept. 14, 1971
[73] Assignee Bell Telephone Laboratories, Inc.
Murray Hill, Berkeley Heights, N.J.

[54] THYRISTOR SWITCH TURNOFF CIRCUIT
9 Claims, 2 Drawing Figs.

[52] U.S. Cl. .......... 307/252, 307/305, 328/67
[51] Int. Cl. .......... H03k 17/00, H03k 17/56
[50] Field of Search .......... 307/252, 305; 328/67

[56] References Cited
UNITED STATES PATENTS
3,218,542 11/1965 Taylor .......... 307/252 X

*Primary Examiner*—Donald D. Forrer
*Assistant Examiner*—John Zazworsky
*Attorneys*—R. J. Guenther and William L. Keefauver

ABSTRACT: Thyristor switches, which are normally reopened by a resonant turnoff circuit, may become permanently conductive (latched on) under gamma radiation. This invention senses the latch-on condition and bypasses current from the thyristor through a normally open switch by repeatedly closing the normally open switch until the thyristor recovers. A resonant charging circuit is utilized to very rapidly restore normal operation after the thyristor switch recovers.

INVENTOR
F. J. ZGEBURA
BY Walter M. Hiel
ATTORNEY

THYRISTOR SWITCH TURNOFF CIRCUIT

GOVERNMENT CONTRACT

The invention herein claimed was made in the course of, or under contract with the Department of the Army.

BACKGROUND OF THE INVENTION

This invention relates to nonlinear solid state device circuits and more particularly to a turnoff circuit for a thyristor switch which has been made permanently conductive because of gamma radiation.

Solid state device modulator circuits of the prior art operate quite satisfactorily in the absence of gamma radiation or strong radio frequency interference. The modulator circuit disclosed in U.S. Pat. No. 3,404,293 granted Oct. 1, 1968 to W. B. Harris, R. P. Massey and F. J. Zgebura is typical of such circuits which involve a series string of thyristors. An elementary form of modulator switch is shown on page 68 of the article by J. J. Aghassi, A. Najman and E. Simon, entitled "Here's a good switch: radiation-resitant thyristors," ELECTRONICS for Apr. 1, 1968, pages 65 through 69. When the thyristors in such circuits are subjected to strong radio frequency interference or radiation fields they remain conductive for a period of time extending beyond the normal turnoff time of their automatic resonant turnoff circuits. This results in a permanently latched on condition because the energy stored in their resonant turnoff circuits is completely dissipated before the radiation field subsides, thereby making recovery by the resonant turnoff circuit impossible. The resonant turnoff circuit can be effective for only a short time which usually does not exceed ten microseconds for most practical modulator circuits. In some systems it is imperative that recovery be effected in as short a time as possible after the environmental condition holding the thyristor switches in their conductive state subsides. The present invention is operative to permit recovery of the thyristors regardless of the duration of their latched-on period and normal operation is restored with negligible delay after all thyristors have recovered.

SUMMARY OF THE INVENTION

This invention comprises a means for turning off a thyristor switch or a plurality of them connected into parallel load circuits, any one or more of which may have become permanently latched on because of an environmental condition such as gamma radiation which has held the switch on over a period extending beyond the turnoff time of its automatic turnoff circuit. A normally open switch is connected across the load circuits which include the thyristor switches and a circuit means, responsive to the drop in voltage across the load circuits, repeatedly closes the normally open switch until all thyristor switches recover. This circuit means causes the first closure to occur after the normal turnoff time has elapsed, each closed interval being longer than the normal recovery time of the thyristor. A very rapid restoration of normal operating conditions is accomplished by employing a resonant charging circuit so arranged that, as the last thyristor recovers, a strong surge of current rapidly charges a capacitor connected in parallel with the load circuits to promptly restore a normal operating voltage across the load circuits as well as to promptly stop the repeated closure of the normally open switch.

BRIEF DESCRIPTION OF THE DRAWINGS

The invention may be better understood by reference to the accompanying drawings in which.

DETAILED DESCRIPTION

Figure 1:
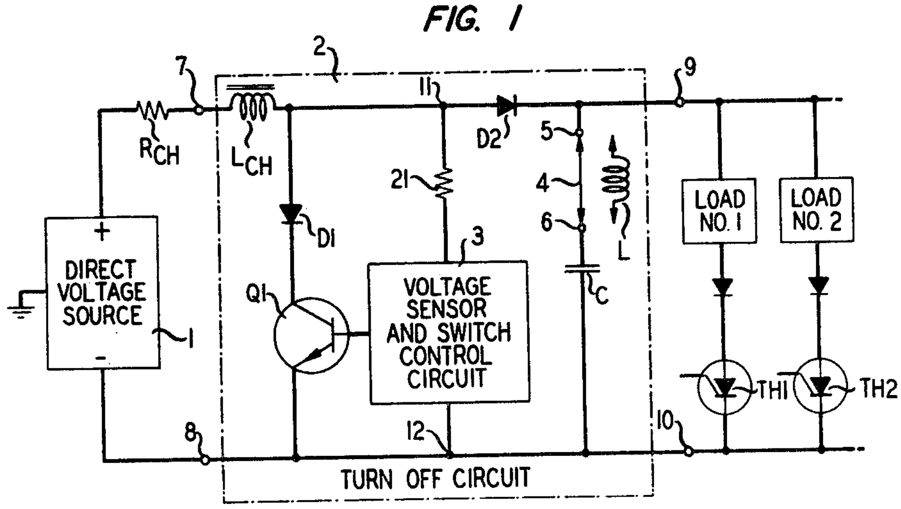
FIG. 1 discloses a circuit embodying the essential features of the invention.

FIG. 1 discloses two of a number of load circuits which may be connected in parallel across a source of direct voltage 1, the source being shown as having positive and negative terminals and an intermediate ground connection identified by the ground symbol. Each load circuit comprises a load in series with a thyristor switch. For example, the first load circuit comprises Load No. 1 and thyristor switch TH1. These parallel-connected load circuits are connected to the direct voltage source 1 through a turnoff circuit 2 having terminals 7, 8, 9 and 10. The negative terminal of the source is connected to the lower ends of the load circuits by way of terminals 8 and 10 and the negative bus in the turnoff circuit, while the positive terminal of the source is connected to the upper ends of the load circuits by way of a current limiting resistor $R_{CH}$, an inductor $L_{CH}$, a diode D2 and terminals 7 and 9. A capacitor C is connected across the load circuits by way or terminals 5 and 6 and either conductor 4 or inductor L. It is to be understood that each of the thyristors in the load circuits include a resonant turnoff circuit, not shown, of the type disclosed in the above-cited U.S. Pat. No. 3,404,293. As previously described, these turnoff circuits normally operate in only a few microseconds and should the ambient radiation condition persist longer than this, the thyristor switches will remain latched on. The diodes in series with the thyristor switches merely isolate the resonant turnoff circuits from the rest of the load circuits during normal automatic turnoff.

Inductor $L_{CH}$ and capacitor C comprise a resonant charging circuit of a well-known type. When a load circuit thyristor switch closes, a strong current flows from capacitor C into the load circuit, thus rapidly lowering the capacitor voltage and permitting a strong current to build up in inductor $L_{CH}$ supplied from source 1. This current establishes a field in inductor $L_{CH}$ so that when the normal resonant turnoff circuit reopens its thyristor, the field rapidly collapses to generate a voltage in the inductor which is series aiding to source 1. This results in a heavy surge of charging current into capacitor C, quickly restoring the normal operating voltage across terminals 9 and 10. As this voltage will exceed the voltage of source 1, a diode D2, in series with this charging circuit, prevents the discharge of the capacitor back to the source voltage.

A normally open switch, shown as transistor Q1, is connected in series with source 1 and inductor $L_{CH}$. This switch will not be closed during normal operation of the load circuits. However, should any thyristor become latched on for any reason, this switch will be caused to repeatedly close until the thyristor recovers. Each closure diverts current from the thyristor, permitting it to recover by recombination of its current carriers. To reduce reverse high voltages across transistor Q1 from normal operation of the resonant turnoff circuits, diode D1 is connected in series with switch Q1. Switch Q1 is under control of the voltage sensor and switch control circuit 3 connected across terminals 11 and 12 to sense an abnormal voltage condition between these two points due to one of the thyristors becoming latched on. When this condition exists, the control circuit causes switch Q1 to repeatedly close and open as previously described.

Figure 2:
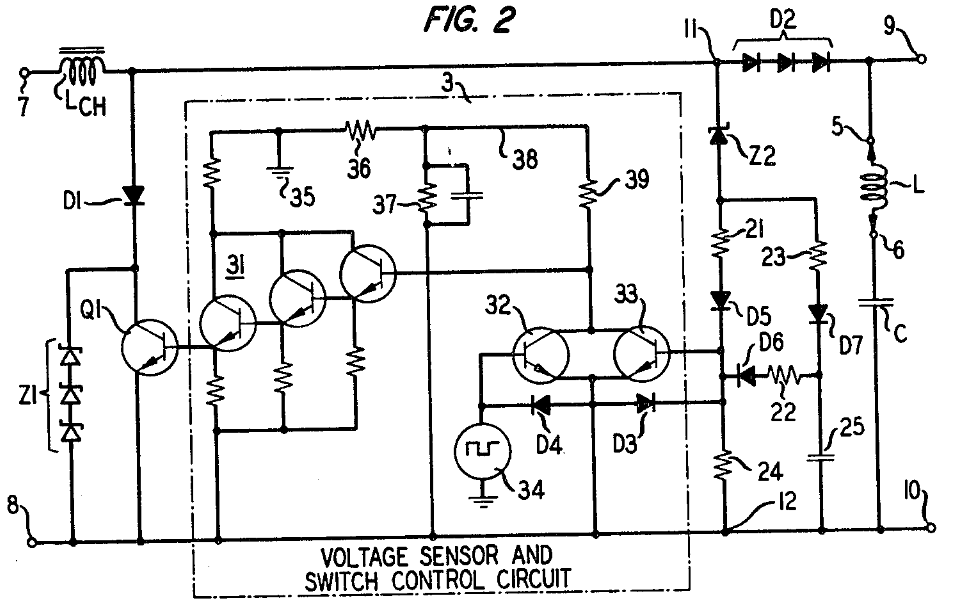
FIG. 2 shows the details of a preferred embodiment of the voltage sensor and switch control circuits which may be used with the circuits of FIG. 1.

The turnoff circuits of FIG. 1 are shown in FIG. 2 with details of a preferred voltage sensor and switch control circuit. FIG. 2 also shows zener diodes Z1 connected across normally open switch Q1. These diodes become conductive the resonant charging action raises the voltage across capacitor C above a predetermined desired limit. When this happens, current is diverted through diode D1 and the zener diodes to clamp the voltage across capacitor C at the desired level.

The voltage sensor and switch control circuits are shown in FIG. 2 to comprise a conventional Darlington amplifier 31 having its output terminal directly connected to the base of transistor Q1. It will be apparent that when the amplifier delivers output current, current will be driven into the base of switch Q1 to make it conductive. The amplifier is supplied with current from the grounded terminal of source 1, ground 35, the collector resistor of amplifier 31 and back to the negative terminal of source 1 through the emitter resistors of amplifier 31 and terminal 8. A fraction of the supply voltage is obtained by the voltage divider comprising resistors 36 and 37 and supplied to a conventional OR gate comprising transistors 32 and 33 by way of conductor 38 and resistor 39. It will be obvious that if either transistor of the OR gate is conducting, no current will flow to the input of amplifier 31 and, consequently, switch Q1 remains open. On the other hand, should both transistors of the OR gate be nonconducting, current will be driven into the input terminal of amplifier 31 from the grounded terminal of source 1, ground 35, resistors 36 and 39 and the conductor leading from the collectors of the OR gate to amplifier 31. The base of transistor 32 is connected to an alternating voltage source 34, preferably of square waveform, so that this transistor is made alternately conducting and nonconducting. If, now, transistor 33 is also made nonconducting for lack of base current, transistor 32 will repeatedly permit current to flow into amplifier 31 to repeatedly close and open switch Q1. Diodes D3 and D4 protect the base-emitter paths of transistors 32 and 33 from reverse voltages.

Current to the base of transistor 33 is obtained from a voltage divider comprising resistors 21 and 24 which are connected in series with diode D5 and zener diode Z2 between terminals 11 and 12. When the load voltage drops and the voltage between terminals 11 and 12 falls below the breakdown voltage of zener diode Z2, current flow through resistor 21 and diode D5 is abruptly stopped. If this condition lasts long enough, the base current to transistor 33 is also interrupted, thus causing switch Q1 to repeatedly operate as previously described. If the drop in voltage between terminals 11 and 12 lasts for only a few microseconds, the time normally required for a resonant turnoff circuit to reopen its thyristor, current will still be supplied for a short time to the base of transistor 33 from capacitor 25 through resistor 22 and diode D6. Consider first the normal conditions just before a thyristor is made conductive. The surge voltage which had charged capacitor C also had raised the voltage across terminals 11 and 12 to cause capacitor 25 to charge through diode D7, resistor 23 and diode Z2. At the same time, this surge voltage had promptly raised the voltage across resistor 24 from current through diode D5 and resistor 21, thereby rendering transistor 33 conductive to maintain switch Q1 open. Now assume that a thyristor becomes latched on so that capacitor 25 has time to discharge through resistor 22, diode D6 and resistor 24, stopping current flow to the base of transistor 33. Transistor 32 of the OR gate is now enabled to cause switch Q1 to repeatedly close and open.

A complete sequence of operation for both the normal and the abnormal conditions can now be stated. Under normal conditions when no thyristor is latched on, a thyristor is triggered to pass current through its load and is promptly turned off a few microseconds later by its own resonant turnoff circuit. This sequence occurs so rapidly that switch Q1 is not caused to close. However, under the abnormal condition when a thyristor has latched on, capacitor 25 has time to discharge and permit transistor 33 to open, thereby causing switch Q1 to repeatedly close and open until the thyristor has recovered. So long as the thyristor is conducting, a field is maintained in inductor $L_{CH}$ but as soon as the thyristor recovers and switch Q1 opens, the resonant charge action promptly drives current into the base of transistor 33 to immediately hold switch Q1 open, recharge capacitors 25 and C and restore the circuit to its normal state to await the triggering of another thyristor.

What is claimed is:

1. A turnoff circuit for a plurality of thyristor switches subject to latch on, a plurality of load circuits, each load circuit comprising a load connected in series with one of said thyristor switches, means including said turnoff circuit coupling said load circuits in parallel across a single source of direct voltage, said turnoff circuit comprising a capacitive means connected across said load circuits, an inductive impedance and a diode connected in series with one terminal of said source and one terminal of said parallel-connected load circuits, a normally open switch connected across said source in series with said inductive impedance, and means connected across said load circuits responsive to a drop in voltage due to closure of a thyristor switch for repeatedly closing said normally open switch until said closed thyristor switch reopens.

2. The combination of claim 1 wherein said normally open switch comprises a transistor switch.

3. The combination of claim 1 and a zener diode connected in parallel with said normally open switch to limit the voltage thereacross.

4. The combination of claim 1 wherein said means connected across said load circuits comprises a pair of transistors, each having an emitter, a collector and a base, the collector and emitter of one transistor being connected respectively to the collector and emitter of the other transistor, the base of one transistor being coupled to said load circuits to receive base current to cause its collector-emitter path to become conductive as the voltage across said load circuit approaches its normal operative level, the base of the other transistor being coupled to a source of alternating voltage to cause its collector-emitter path to be alternatively conductive and nonconductive.

5. The combination of claim 4 wherein said normally open switch comprises a transistor switch and a circuit means coupling said transistor switch to said pair of transistors to cause said transistor switch to close whenever the base-emitter paths of both of said pair of transistors are nonconductive.

6. A turnoff circuit for a thyristor switch subject to latch on, a load circuit comprising said thyristor switch connected in series with a load, a direct voltage source connected to said load circuit, said turnoff circuit comprising an inductor connected in series with said source and load circuit, a capacitor connected across said load circuit, said inductor and capacitor comprising a resonant charging circuit to rapidly restore a normal operating voltage across said load circuit promptly after said thyristor switch reopens, a normally open switch connected in series with said source and said inductor, a voltage sensor circuit connected across said load circuit to sense a drop in voltage thereacross due to latch on of said thyristor switch, and a control circuit coupling said voltage sensor circuit to said normally open switch to cause said normally open switch to repeatedly close whenever the load voltage lowers and to remain open whenever the load voltage exceeds a predetermined limit approaching its normal operating level.

7. The combination of claim 6 wherein said normally open switch comprises a transistor switch.

8. The combination of claim 6 and a zener diode connected in parallel with said normally open switch to limit the voltage thereacross.

9. The combination of claim 6 wherein said voltage sensor circuit includes an OR gate having two input terminals, one of said terminals being coupled across said load circuit to receive current only when said load circuit voltage exceeds a predetermined limit approaching its normal operating level, a source of alternating voltage, means coupling the other terminal to said source of alternating voltage to receive current only on one polarity of said alternating voltage and circuit means coupling said OR gate to said normally open switch to cause said normally open switch to close only when both input terminals of said OR gate receive no current.